UNITED STATES PATENT OFFICE.

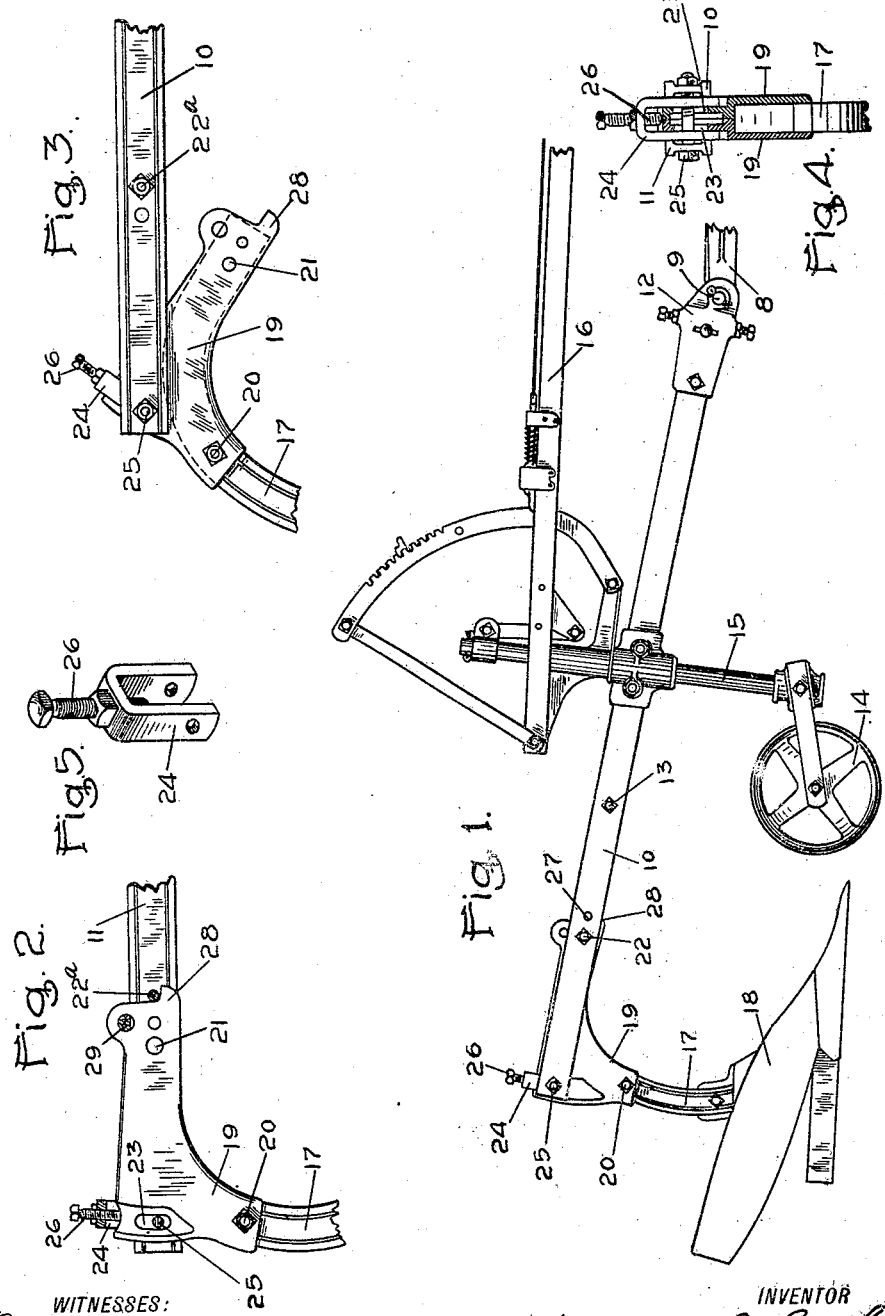

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

GANG-PLOW.

992,497.  Specification of Letters Patent.  Patented May 16, 1911.

Original application filed November 1, 1909, Serial No. 525,720. Divided and this application filed February 24, 1910. Serial No. 545,656.

*To all whom it may concern:*

Be it known that I, WILLIAM S. GRAHAM, a citizen of the United States, residing at Canton, in the county of Fulton, State of Illinois, have invented certain new and useful Improvements in Gang-Plows, of which the following is a specification, reference being had to the accompanying drawings.

This invention relates to gang plows and has for its object to provide new and improved means whereby the plow may be adjusted to raise or lower the point to give the plow the desired suction. This I accomplish by providing means for adjusting the standard upon the lower end of which the plow is carried.

Another object is to provide a construction in which the plow may be held in position by means of a break pin for use in ground where obstructions are likely to be met, the plow being permitted to swing backward out of the way of any obstruction and thus saving it from injury or breakage. In the construction shown, the break pin is used in the connection between the plow standard and the plow beam, the construction being such that the standard may either be held in working position by means of the break pin or be fixed in position without the use of a break pin if desired.

This application is a divisional application, the subject-matter shown and claimed herein having been disclosed, described and claimed originally in application for patent on gang plows Ser. No. 525,720, filed by me on November 1, 1909, and subsequently divided out of said application.

In the drawings:—Figure 1 is a side view of a plow beam connected in any suitable manner to a bracket forming part of the draft frame of a gang plow. Fig. 2 is an enlarged detail, partly in section, showing the means for connecting the plow standard to the plow beams one of the plow beams being removed better to show the construction, the connection being made by means of a break pin. Fig. 3 is an enlarged detail showing the position the parts shown in Fig. 2 may assume when the break pin is removed or broken. Fig. 4 is an enlarged detail, being a view from the left of the parts shown in Fig. 2, partially in vertical cross-section. Fig. 5 is an enlarged detail, being a view of the yoke and set-screw by means of which the plow standard is adjusted on the plow beams.

8 indicates a bracket forming part of the draft frame of a gang plow, to which are secured by means of a pin 9 coupling devices 12 of any approved type by means of which plow beams 10—11 are adapted to be connected to the draft frame.

13 indicates a bolt which passes through openings in beams 10—11 and serves to brace said beams more firmly together.

14 indicates a gage wheel mounted below the beams 10—11 in any approved manner, preferably in the manner shown and claimed in my application for patent on gang plows above referred to, in which the standard 15 upon which the wheel is mounted is free to turn and in which the gage wheel is adapted to be raised or lowered relative to the plow beams by means of a lever 16, which lever, in turn, is adapted to be swung on the standard 15 and set in any desired position. It is not believed to be necessary to further describe this mechanism herein, as it forms no part of the present invention.

17 indicates a plow standard having secured upon its lower end in any suitable manner a plow 18 of any approved type. As shown in dotted lines in Fig. 3, the upper end of the standard 17 is curved forward and, as shown in Figs. 3 and 4, has secured upon it at each side a plate 19. These plates 19 are separate from each other and separate from the standard 17 and are secured in position on the standard by means of a bolt 20 and rivet 21, but they may be secured in place in any other suitable manner without departing from my invention. As shown in Fig. 1, the front end of the standard and plates 19 are adapted to be secured in position between the beams 10—11 by a bolt 22.

Referring now to the means by which the plates are secured between the beams 10—11 at their rear ends so as to be permitted to swing pivotally thereon when a break pin is used and so that the angle of the standard may be adjusted to vary the suction of the plow either when a break pin is used or when the standard is fixed rigidly in place, 23 indicates a slot in each of the plates 19, such slots being substantially in the form of an arc of a circle about the holes in the plates through which the bolt 22 is adapted to pass.

24 indicates a yoke which straddles the plates 19, in the construction shown, each arm of the yoke being located between one of the beams 10—11 and the adjacent plate 19.

25 indicates a bolt which passes through holes in the arms of the yoke 24 and in the beams 10—11 and through the slots 23, the yoke being thus held against vertical movement relative to the beams, the slots in the plates 19 permitting the plates to have a limited up and down movement relative to the yoke and relative to the beams.

26 indicates a set-screw screw-threaded in the end of the yoke 24 and bearing at its lower end against the plates 19, being thus adapted to limit the upward movement of the rear ends of the plates as desired. The plates 19 being secured at their forward ends against vertical movement, a slight vertical movement of the rear ends of the plates will suffice to change the angle at which the standard 17 stands, changing accordingly the position of the plow, as will be readily understood.

27 indicates holes through the beams 10—11 in advance of the holes in which the bolt 22 is shown in Fig. 1, through which holes the bolt 22 is adapted to be passed when a break pin is to be used, as shown in Figs. 2 and 3, said bolt in its changed location being indicated by 22ª.

28 indicates a lug on the front face of each of the plates 19 adapted to bear against the bolt 22ª and adapted to prevent upward movement of the front ends of the plates 19 relative to the beams.

29 indicates a break pin extending through suitable holes in the plates 19, the holes being so positioned that the pin 29 extends across the upper edges of the beams 10—11. This pin normally holds the front ends of the plates against downward movement relative to the beams, but when an obstruction is met by the plow the pin is adapted to break and permit the plow to swing backward on the bolt 25 as a pivot, thus preventing any undue strain upon or breakage of the parts other than the pin.

What I claim as my invention and desire to secure by Letters Patent is,—

1. The combination of a draft frame, plow beams pivotally connected at their front ends with said draft frame, a standard extending forward along said beams at its upper end, a plow mounted on the lower end of said standard, means for pivotally connecting said standard at the rear ends of said beams, and a break pin holding the forward end of said standard normally against movement relative to said beams, said pivotal connections comprising a bolt passing through slotted openings and means for holding said bolt at different adjusted positions in said slots.

2. The combination with a draft frame, plow beams pivotally connected at their front ends with said draft frame, a standard pivotally connected at its upper end with said plow beams, said standard being provided with a slot arranged in the position of an arc about the pivotal point of said standard, a bolt passing through said beams and through the slot in said standard, a yoke pivotally mounted on said bolt, a set-screw in said yoke adapted to bear upon said standard in any adjusted position relative to said beams and to hold the standard against movement in one direction, and a plow carried on said standard.

3. The combination with a draft frame, two plow beams connected at their front ends with said draft frame, a standard, side plates on the upper end of said standard and adapted to be embraced between said plow beams and provided near their rear ends with substantially vertical slots, a yoke adapted to straddle said plates between the same and the two plow beams, a bolt passing through said beams through said yoke and through the slots in said plates, and a set screw in said yoke adapted by its movement to vary the angular relation of said standard to said plow beams.

4. The combination with a draft frame, two plow beams connected at their front ends with said draft frame, a standard, side plates on the upper end of said standard and adapted to be embraced between said plow beams and provided near their rear ends with substantially vertical slots, a yoke adapted to straddle said plates between the same and the two plow beams, a bolt passing through said beams through said yoke and through the slots in said plates, and a set-screw in said yoke adapted by its movement to vary the angular relation of said standard to said plow beams, the forward ends of said plates being adapted to carry a break pin bearing upon the upper surface of said plow beams.

WILLIAM S. GRAHAM.

Witnesses:
H. W. JONES,
W. M. CAVES.